United States Patent [19]

Lang et al.

[11] Patent Number: 4,902,518
[45] Date of Patent: Feb. 20, 1990

[54] LOW ALCOHOL WINE

[75] Inventors: Timothy R. Lang, Pymble; Donald J. Casimir, Castle Cove, both of Australia

[73] Assignees: Bioquip Australia Pty. Limited, St. Leonards; Commonwealth Scientific and Industrial Research Organization, Campbell, both of Australia

[21] Appl. No.: 117,878

[22] Filed: Nov. 9, 1987

Related U.S. Application Data

[63] Continuation-in-part of Ser. No. 780,646, Sep. 26, 1985, abandoned.

[30] Foreign Application Priority Data

Sep. 27, 1984 [AU] Australia .............................. PG7363

[51] Int. Cl.$^4$ ............................................... C12G 1/00
[52] U.S. Cl. ........................................ 426/14; 426/15; 426/384; 426/387; 426/431; 426/493; 426/494; 426/592
[58] Field of Search .................... 426/11, 14, 15, 384, 426/386, 387, 431, 493, 494, 592

[56] References Cited

U.S. PATENT DOCUMENTS

| | | | |
|---|---|---|---|
| 2,895,835 | 7/1959 | Findlay | 426/384 |
| 3,285,025 | 11/1966 | Shaul | 426/384 |
| 3,361,570 | 1/1968 | Malik | 426/384 |
| 3,402,047 | 9/1968 | Shaul | 426/384 |
| 3,935,317 | 1/1976 | Bianchi | 426/14 |
| 4,265,920 | 5/1981 | Thijssen | 426/384 |
| 4,363,264 | 12/1982 | Lang et al. | 100/117 |
| 4,405,652 | 9/1983 | Boucher | 426/14 |
| 4,468,407 | 8/1984 | Vella | 426/14 |
| 4,570,534 | 2/1986 | Boucher | 99/277 |
| 4,626,437 | 12/1986 | Schobinger et al. | 426/14 |

Primary Examiner—Marianne Cintins
Attorney, Agent, or Firm—Millen, White & Zelano

[57] ABSTRACT

A method for the production of low alcohol wine comprising separating a fruit juice into a high sugar fraction and a low sugar fraction, stripping volatile components, such as high-boiling point esters, from the fruit juice or from the high sugar fraction and adding them to the low sugar fraction, and fermenting the low sugar fraction. A preferred method of separating the fruit juice into high and low sugar fractions is by fractional crystallization.

9 Claims, 2 Drawing Sheets

LOW ALCOHOL WINE

This is a continuation-in-part of application Ser. No. 780,646 filed Sept. 26, 1985; now abandoned.

BACKGROUND OF THE INVENTION

The present invention relates to a method for the production of low alcohol wine and to a low alcohol wine so produced.

Wine is the fermented juice of fruit, particularly grapes. The natural alcohol content of wine will depend upon the sugar content of the fruit juice. Typically grapes when picked ripe will yield a juice containing about 19% by weight fermentable sugar. Such juice, if fermented to dryness, i.e. to a point where all the sugar is consumed, will have an alcohol content of about 12% by volume. It is possible to stop the fermentation before all the sugar has been fermented however this will necessarily result in a sweet wine. The degree of sweetness in low alcohol wines produced by this method is unacceptable.

It is also known to ferment the fruit juice to dryness and then to de-alcoholise the wine by, for instance, vacuum evaporation. This process is both expensive and deleterious to wine quality.

In another process as disclosed in U.S. Pat. No. 4,468,407 (Vella), there is provided a method of producing low alcohol wine wherein a standard alcoholic beverage is cooled to produce a liquid fraction which is high in alcohol and a solid fraction that is low in alcohol. The advantage of this process lies in the use of low temperature to separate the fractions thereby ensuring minimal loss of flavour.

SUMMARY OF THE INVENTION

The present inventors have developed an alternative approach to the production of low alcohol wine by separating the unfermented fruit juice into a high sugar fraction and a low sugar fraction, removing volatile components from the unfermented fruit juice or from the high sugar fraction and transferring them to the low sugar fraction which is then fermented. In this way low alcohol wine may be produced cheaply and the neutral, or deflavoured, high sugar stream is available for other uses.

The present invention consists in a method for the production of low alcohol wine comprising crushing a fruit, separating the crushed fruit into juice and skins, freezing the juice to form a slush, separating the slush into a liquid high sugar fraction and a solid low sugar fraction, the volume ratio of said high sugar to said low sugar fraction being from 40:60 to 70:30, each fraction having a sugar content of from 2 to 30% by weight, melting the low sugar fraction, stripping volatile components in an amount of from 1 to 15% by volume from either the juice or the high sugar fraction and adding them to the low sugar fraction, forming a skin extract by extracting the skins with water or low sugar fraction, adding the skin fraction to the low sugar fraction, and fermenting the low sugar fraction.

The present invention further consists in a low alcohol wine produced by a method according to the present invention.

In a preferred aspect said slush is separated into a high sugar fraction and a low sugar fraction by introducing the slush into an inlet of an extractor, said extractor comprising: an elongate housing in the form of a trough or tube and having said inlet at or adjacent one end and an outlet at or adjacent the other end, the longitudinal axis of the housing being inclined upwardly from the one end to the other end, a screw conveyor having at least one substantially helical flight disposed within the housing and rotatable about its longitudinal axis for moving a solid fraction of the slush, from the said one end to the said other end of the housing, drive means for causing the screw conveyor to rotate and for causing the direction of rotation of the screw conveyor to be intermittently reversed while providing a net forward motion of said solid fraction from the one end to the other end, and operating the extractor in a manner such that a solid low sugar containing fraction is discharged from the outlet of the extractor and a high sugar containing fraction of unfrozen or melted liquid drains from the inlet of the extractor.

In a further preferred aspect said skin extract is formed by passing the skins into an inlet of an extractor, said extractor comprising: an elongate housing in the form of a trough or tube and having said inlet at or adjacent one end and an outlet at or adjacent the other end, the longitudinal axis of the housing being inclined upwardly from the one end to the other end, a screw conveyor having at least one substantially helical flight disposed within the housing and rotatable about its longitudinal axis for moving said skins from the said one end to the said other end of the housing, means for introducing water or low sugar fraction into the said other end of the housing in a manner such that it will flow down the housing to the one end thereof and in counter current with the skins, drive means for causing the screw conveyor to rotate and for causing the direction of rotation of the screw conveyor to be intermittently reversed while providing a net forward motion of skins from the one end to the other end, and means for withdrawing water or low sugar fraction from the housing at a point at or adjacent the one end thereof, for heating the withdrawn liquid, and for returning the heated liquid into the housing such that the returned heated liquid will contact the skins.

DETAILED DESCRIPTION

While this process is particularly adapted for use with aqueous solutions it could also be used with organic solutions. The process is hereinafter described with reference to sugar solutions but the process could equally well be used with other solutions. As an example the process could be used for concentrating ethanol in aqueous solutions.

In preferred embodiments of the invention the fruit juice will be grape juice however the juice of other fruits could also be similarly treated to produce a low alcohol wines. The fruit are preferably crushed, dejuiced and pressed in a conventional manner. The juice may also be clarified and refrigerated if desired, again in a conventional manner.

The juice is separated into a high sugar stream and a low sugar stream. This is most preferably done by freezing the juice to form a slush containing a solid low sugar fraction and a liquid high sugar fraction. The solid low sugar fraction will be separated from the high sugar fraction. It will be appreciated that the separation into high and low sugar fractions could also be carried out by ultrafiltration, reverse osmosis, centrifugation, flotation or rotary vacuum filtration, or by any other suitable technique.

If the juice is to be separated into fractions by freezing to form a slush this is best done in a scraped surface slush freezer although it will be appreciated that other types of freezer could be used. The slush is most preferably separated into its solid and liquid components in a counter-current diffusion extractor such as is described in U.S. Patent Specification No. 4,363,264. In this equipment the liquid fraction may be drained from the solid frozen fraction. In addition water, fruit juice or melted low sugar fraction may be run in counter-current with the slush. This will have the effect of carrying the high sugar solution clear of the frozen particles of the low sugar fraction and enhance the separation of the high and low sugar fractions. The absolute concentration of the sugar in the high sugar stream will however be lowered by the use of such a counter-current stream. The use of this apparatus has been found to bring about the efficient separation of the solids from the liquid. The intermittent reversal of direction of the screw conveyor has been found to prevent the icy solids from compacting into a solid block which would be difficult to handle and from which it would be difficult to get the high sugar fraction to drain.

The ratio of the volume of the high sugar fraction to the volume of the low sugar fraction is preferably from 40:60 to 70:30, more preferably from 50:50 to 60:40. The sugar content of the two fractions preferably varies by from 2 to 30% by weight of sugar, more preferably from 10 to 25% by weight. The high sugar fraction will typically contain from 20 to 30% by weight of sugar while the low sugar fraction will typically contain from 5 to 15% by weight of sugar.

The high sugar fraction will contain, in addition to the sugar, a number of volatile components which are typically high boiling point esters. These volatile components give to the finished wine flavours which are characteristic of the fruit and/or of the particular variety of the fruit from which the juice is derived. These esters are stripped from the high sugar fraction and added to the low sugar fraction in appropriate concentration. This stripping of the high boiling point esters may be done in any suitable fractional distillation column however it is preferably done in a spinning cone column such as is described in Australian patent specification 62264/73. In columns of this type radial fins reduce the pressure across the column. This allows high separation efficiencies to be achieved at low distillation temperatures.

The stripped component from the high sugar fraction typically comprises from 1 to 15% by volume of that fraction, preferably 6 to 11% by volume. The remaining neutral high sugar fraction will contain a substantial amount of fruit derived sugar and may be used for fermentation and subsequent distillation to fortifying spirit, for addition to wine for sweetening purposes, or for addition to canning syrups and the like for use in the food industry.

A third component may be added to the low sugar fraction if desired. This third component is derived from the pressed skins of the fruit and may be used to add acid, flavour, tannins and colour to the low sugar fraction. This third component, hereinafter called the skin fraction, is particularly useful in the making of wine from grapes. In this fruit significant flavourants and colourants are largely contained in the grape skins and it is desirable that a proportion of these materials be incorporated into the finished wine.

The skin fraction is formed by extracting the pressed skins, commonly referred to as marc, with water or with low sugar fraction and clarifying the skin fraction if desired. The extraction is preferably carried out in a counter current diffusion extractor substantially as described in U.S. Patent Specification No. 4,363,264.

In this apparatus the pressed skins of the fruit are conveyed in one direction by the screw conveyor while a counter flowing liquid such as water, the low sugar fraction or raw grape juice is flowed in the other direction through the housing containing the screw conveyor. If desired the skin fraction is clarified in a conventional manner. If the counter flowing liquid bringing about the extraction is water it may be desirable to concentrate the skin fraction prior to its addition to the low sugar fraction. This concentration may be brought about by evaporation, membrane separation or any other conventional technique.

BRIEF DESCRIPTION OF THE DRAWINGS

Hereinafter described by way of example only is a preferred embodiment of the present invention described with reference to the accompanying drawings in which.

Figure 1:
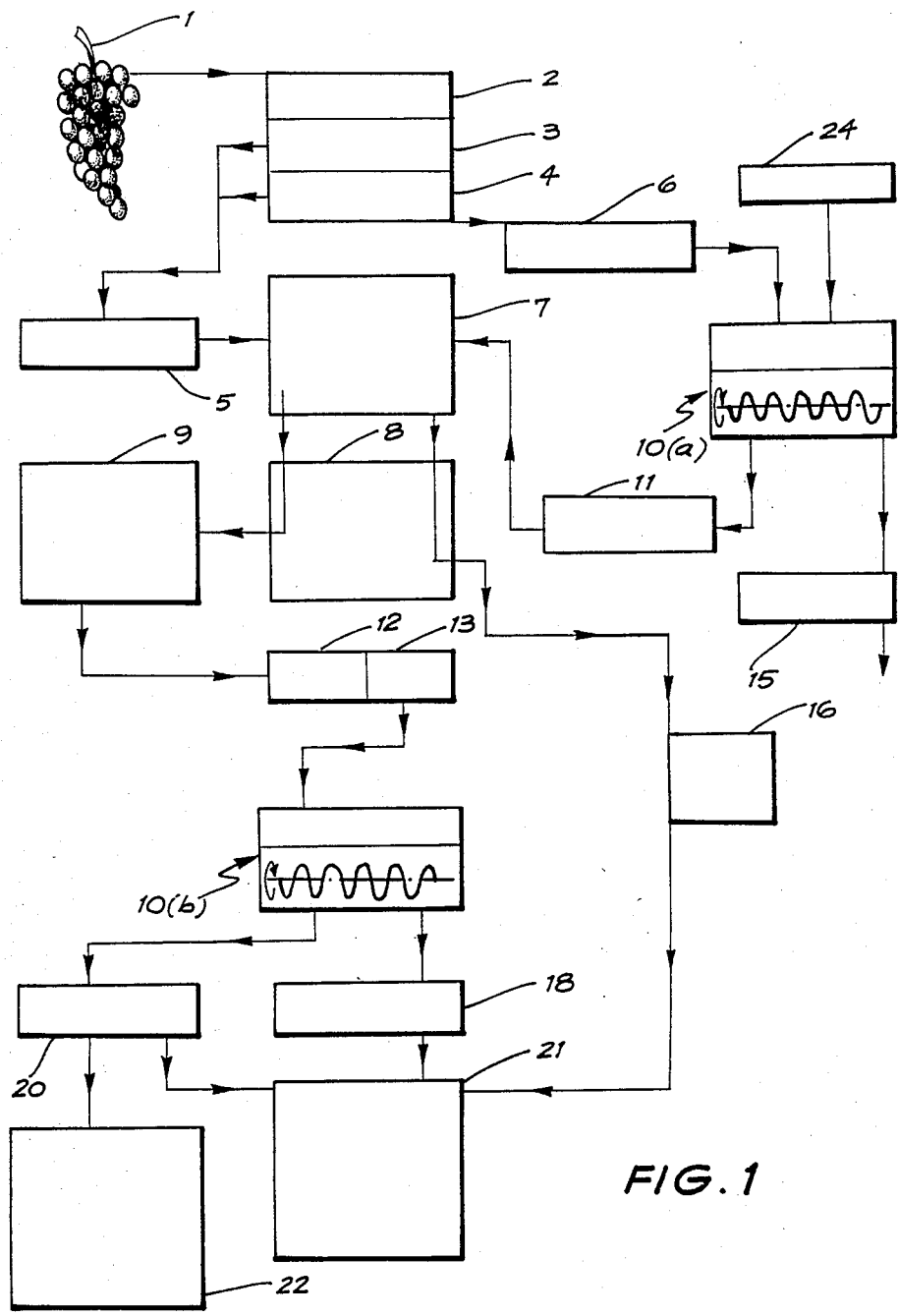
FIG. 1 is a flow diagram showing a process for making low alcohol wine according to the present invention.

Grapes 1 are fed to a crusher 2, a dejuicer 3 and a press 4 for crushing and pressing in a conventional way. The unclarified juice amounted to approximately 820 liters of juice per tonne of grapes crushed and had a sugar content of 19% by weight. The juice was run into a tank 5.

The juice from tank 5 was clarified in a clarifier 7 which comprised a centrifuge, a rotary drum solids filter or a pressure leaf filter and the clarified juice was cooled in refrigerator 8 and passed to cold room 9 for storage at a temperature of about $-2°$ C.

The stored juice is, as required, passed through a plate heat exchanger 12 which receives the cooled juice from cold room 9 and passes it to a scraped surface slush freezer 13.

In the scraped surface slush freezer 13 the juice is partly frozen to form a slush having a solid phase of a relatively dilute sugar content—the low sugar fraction—and a liquid phase of a relatively concentrated sugar content—the high sugar fraction.

Figure 2:
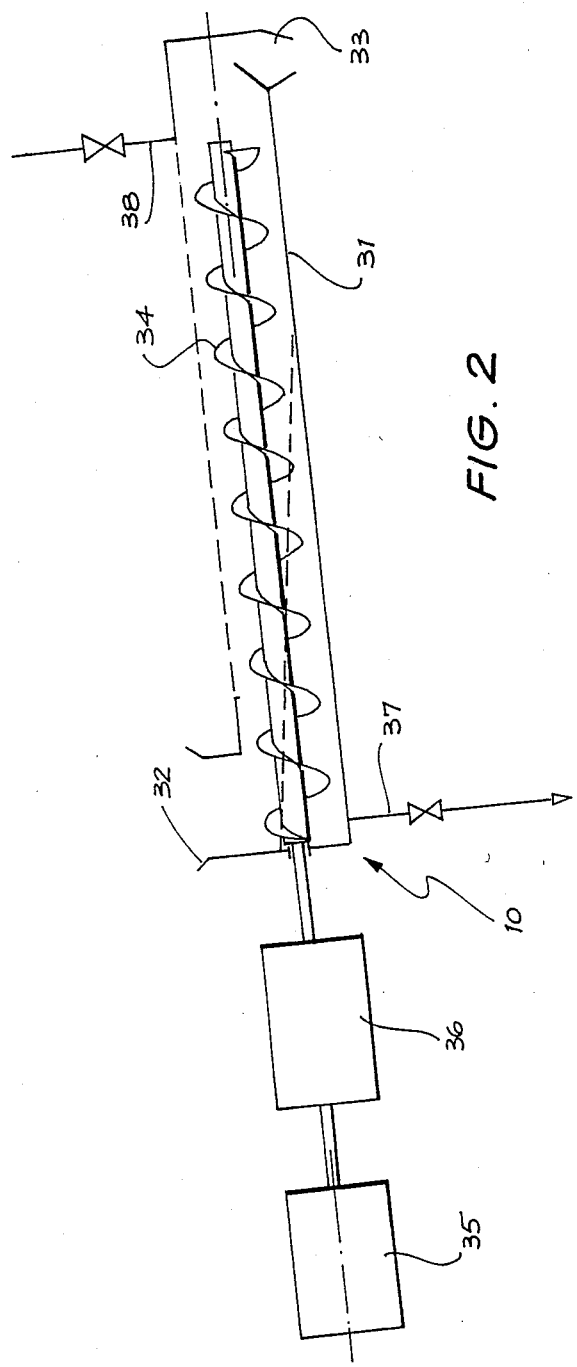
FIG. 2 is a longitudinal vertical section through an extractor for carrying out the separation of a sugar containing liquid into a high sugar stream and a low sugar stream according to the present invention.

The slush so formed is passed to a counter current extractor 10(b) substantially as described with reference to U.S. Patent Specification No. 4,363,264, except that there is no heating. As is seen in FIG. 2 the counter current diffusion extractor 10 comprises a trough-like housing 31 having an inlet 32 at one end and an outlet 33 at the other. The housing is inclined upwardly from its inlet end 32 to its outlet end 33. A helical screw conveyor 34 is disposed within the housing 31 and is arranged to be rotated about its own longitudinal axis. The conveyor 34 is rotated by a motor 35. A gear box 36 disposed between the motor 35 and conveyor 34 which causes the direction of rotation of the conveyor 34 to be intermittently changed while preserving a net forward motion of any solids in the extractor 10(b) towards the outlet end 33 of the housing 31. A liquids outlet 37 is provided at the lower end of the housing and a liquids inlet 38 is provided at the upper end of the housing to allow the passage of a liquid in counter current with the solids in the extractor 10(b) if required.

The solids in the slush from the scraped surface slush freezer 13 are carried upwardly through the extractor 10(b) by the screw conveyor 34. The intermittent reversal of direction of the screw conveyor 34 increases the efficiency with which the high sugar fraction is drained from the solids and removed with the added counter-flowing liquid stream or remelt as required. This also prevents compaction of the solids into large frozen blocks.

On discharge from the outlet 33 of the extractor 10(b) the solid low sugar fraction is passed through the heat exchanger 18 to facilitate its melting and then into tank 21. Typically the low sugar fraction was produced in an amount of 320 liters per tonne of grapes pressed and had a sugar content of 10% by weight.

The liquid fraction discharged through liquid outlet 37 is the high sugar fraction and comprised typically 480 liters per tonne of grapes pressed and had a sugar content of 28% by weight. This high sugar fraction contains many of the flavourant compounds which give the wine its characteristic flavour. These are stripped in a spinning cone column 20 having 40 cone sets and a 6 inch diameter. Fins are present on the underside of the rotating plates as described in Australian patent specification 62264/73. The operation of the column was adjusted such that about 50 liters of stripped flavourant fraction was removed from the high sugar fraction per tonne of grapes pressed. These flavourants were combined in tank 21 with the low sugar fraction.

The pressed skins 6 from the press 4 were passed to another counter current extractor 10(a) where they were passed in counter with water 24. The extracted skins 15 which had passed through the outlet 33 of the extractor 10(a) were dumped. The extract skin fraction 11 amounted to 100 liters per tonne of grapes crushed and had a 10% sugar content. The skin fraction 11 was fined, clarified in clarifier 7, refrigerated in refrigerator 8 and stored in cold room 16. This clarified and chilled skin fraction was added to the low sugar fraction in tank 21 yielding a total combined low sugar fraction of 420 liters per tonne of grapes and having about a 10% sugar content by weight.

The low sugar fraction was fermented and clarified in the usual way to yield a low alcohol wine containing 6% alcohol by volume and representing 400 liters per tonne of grapes crushed. If desired this wine, which is dry could be sweetened by the addition of some of the low sugar fraction or juice after fermentation has been completed. This will further reduce the alcohol content of the finished wine to about 5%.

We claim:

1. A method for the production of low alcohol wine, comprising the steps of crushing a fruit, separating the crushed fruit into juice and skins, freezing the separated juice to form a slush, separating the slush into a liquid high sugar fraction and a solid low sugar fraction, the volume ratio of said high sugar to said low sugar fraction being from 40:60 to 70:30, each fraction having a sugar content of from 2 to 30% by weight, melting the low sugar fraction, stripping volatile components in an amount of from 1 to 15% by volume from either the juice obtained after crushing the fruit or the high sugar fraction obtained after slush separation and adding resultant stripped volatile components to the low sugar fraction, forming a skin extract by extracting the skins with water or low sugar fraction, adding the resultant skin extract to the low sugar fraction, and fermenting the low sugar fraction.

2. A method as in claim 1 wherein said slush is separated into a high sugar fraction and a low sugar fraction by introducing the slush into an inlet of an extractor, said extractor comprising: an elongate housing in the form of a through or tube and having said inlet at or adjacent one end and an outlet at or adjacent the other end, the longitudinal axis of the housing being inclined upwardly from the one end to the other end, a screw conveyor having at least one substantially helical flight disposed within the housing and rotatable about its longitudinal axis for moving a solid fraction of the slush, from the said one end to the said other end of the housing, drive means for causing the screw conveyor to rotate and for causing the direction of rotation of the screw conveyor to be intermittently reversed while providing a net forward motion of said solid fraction from the one end to the other end, and operating the extractor in a manner such that a solid low sugar containing fraction is discharged from the outlet of the extractor and a high sugar containing fraction of unfrozen or melted liquid drains from the inlet of the extractor.

3. A method as in claim 2 wherein water, juice or melted low sugar fraction is run in counter current with the slush.

4. A method as in claim 1 wherein the sugar content of the high sugar fraction is from 20% to 30% by weight and the sugar content of the low sugar fraction is from 5 to 15% by weight.

5. A method as in claim 1 wherein the ratio of the volume of the high sugar fraction to the volume of the low sugar fraction is from 50:50 to 60:40.

6. A method as in claim 1 wherein 6 to 11% of volatile component by volume of said high sugar fraction is stripped.

7. A method as in claim 6 wherein volatile components are stripped from the high sugar fraction using a spinning cone fractional distillation column.

8. A method as in claim 1 wherein said skin extract is formed by passing the skins into an inlet of an extractor, said extractor comprising: an elongate housing in the form of a trough or tube and having said inlet at or adjacent one end and an outlet at or adjacent the other end, the longitudinal axis of the housing being inclined upwardly from the one end to the other end, a screw conveyor having at least one substantially helical flight disposed within the housing and rotatable about its longitudinal axis for moving said skins from the said one end to the said other end of the housing, means for introducing water or low sugar fraction into the said other end of the housing in a manner such that it will flow down the housing to the one end thereof and in counter current with the skins, drive means for causing the screw conveyor to rotate and for causing the direction of rotation of the screw conveyor to be intermittently reversed while providing a net forward motion of skins from the one end to the other end, and means for withdrawing water or low sugar fraction from the housing at a point at or adjacent the one end thereof, for heating the withdrawn liquid, and for returning the heated liquid into the housing such that the returned heated liquid will contact the skins.

9. A method for the production of low alcohol wine comprising the steps of freezing a fruit juice to form a slush, separating the slush into a liquid high sugar fraction and a solid low sugar fraction, the volume ratio of said high sugar to said low sugar fraction being from 40:60 to 70:30, each fraction having a sugar content of from 2 to 30% by weight, melting the low sugar fraction, stripping volatile components in an amount of from 1 to 15% by volume from either said fruit juice or the high sugar fraction obtained after slush separation and adding resultant stripped volatile components to the low sugar fraction, forming a skin extract by extracting fruit skins with water or the aforesaid low sugar fraction, adding the resultant skin extract to the low sugar fraction, and fermenting the low sugar fraction.

* * * * *